United States Patent [19]

Patrick et al.

[11] Patent Number: 5,550,972
[45] Date of Patent: Aug. 27, 1996

[54] METHOD AND APPARATUS FOR EFFICIENT TRANSFER OF DATA TO MEMORY

[75] Inventors: Stuart R. Patrick, Issaquah; Amit Chatterjee, Redmond, both of Wash.

[73] Assignee: Microsoft Corporation, Redmond, Wash.

[21] Appl. No.: 86,331

[22] Filed: Jun. 30, 1993

[51] Int. Cl.⁶ .................................................. G06F 12/02
[52] U.S. Cl. ..................... 395/164; 364/DIG. 1; 364/238.7; 364/238.8; 364/244.4; 364/244.5; 364/259.5; 364/262; 395/131; 395/307
[58] Field of Search ............................. 364/200 MS File, 364/900 MS File, 238.7 MS File, 238.8 MS File, 293.3 MS File, 244.4 MS File, 244.5 MS File, 259.5 MS File, 262 MS File; 395/400, 425, 164, 307, 310, 436, 437, 411, 131, 307

[56] References Cited

U.S. PATENT DOCUMENTS

| | | | |
|---|---|---|---|
| 4,309,754 | 1/1982 | Dinwiddie, Jr. | 395/307 |
| 4,513,392 | 4/1985 | Shenk | 395/437 |
| 4,580,214 | 4/1986 | Kubo et al. | 395/280 |
| 4,667,305 | 5/1987 | Dill et al. | 395/307 |
| 4,773,026 | 9/1988 | Takahara | 364/518 |
| 4,841,435 | 6/1989 | Papenberg | 395/250 |
| 4,992,931 | 2/1991 | Hirasawa | 395/500 |
| 5,202,962 | 4/1993 | Matsuo et al. | 395/131 |
| 5,297,242 | 3/1994 | Miki | 395/307 |
| 5,319,750 | 6/1994 | Matsuo et al. | 395/166 |
| 5,332,995 | 7/1994 | Katsura et al. | 345/121 |
| 5,355,443 | 10/1994 | Kim et al. | 395/131 |

OTHER PUBLICATIONS

*The LR33020 GraphX Processor: A Single Chip X–Terminal Controller;* Robert Tobias, Digest of Papers from 37th IEEE Computer Society International Conference, pp. 358–363; Feb. 24, 1992.

*Data Width and Format Conversion Subsystem for a Graphics Coprocessor;* IBM Technical Disclosure Bulletin, vol. 33, No. 3A, pp. 145–152; Aug. 1990.

*Primary Examiner*—Matthew M. Kim
*Assistant Examiner*—Hiep T. Nguyen
*Attorney, Agent, or Firm*—Klarquist Sparkman Campbell Leigh & Whinston

[57] ABSTRACT

A method for storing a sequence consisting of a repeated data pattern of three bytes to a memory in double word increments aligned with double word boundaries. A register is loaded with the first four bytes of the sequence. The contents of the register are then repeatedly stored to consecutive locations of the memory. Between each storing of the register's contents, the contents are updated to the next four bytes of the sequence by shifting the second through fourth bytes to the first through third bytes and also moving the second byte to the fourth byte. When the beginning address where the sequence is to be stored in memory is not aligned with a double word boundary, the initial bytes of the sequence up to the double word boundary are stored and the contents of the register updated to the next four bytes of the sequence.

23 Claims, 4 Drawing Sheets

METHOD AND APPARATUS FOR EFFICIENT TRANSFER OF DATA TO MEMORY

FIELD OF THE INVENTION

This invention relates to methods and apparatus for storing in a memory a repeated pattern of data whose length is not optimal for transfer to the memory. More particularly, this invention relates to a novel, efficient method and apparatus for including the repeated pattern in a repeating sequence of data whose length is optimal for memory transfer.

BACKGROUND OF THE INVENTION

In one type of computer graphics imaging known as bit-mapped graphics, the color of each pixel of an image is controlled by a group of one or more data bits stored in a memory or frame buffer. Generally, the data bits are stored in a sequential order in the memory such as in a series or string of bytes. Commonly, a byte contains eight bits, but not necessarily, and in the specification the term is to be understood as including a group of bits of any convenient length. (Generally, the smallest addressable unit of the memory is a byte.) The group of bits controlling the color of the pixel in the top left corner of the image is usually placed first in the memory. Following is the group of bits that control the pixel to the right of the first pixel. This sequential organization of the data bits in the memory proceeds from left to right along the top line of pixels, then from left to right along each line from the top to the bottom of the image.

The sequential organization of the data in the memory can be advantageous to computer manipulation of the graphics image. For example, since consecutive groups of data bits in the memory map to consecutive pixels in horizontal lines of the image, horizontal line segments can be drawn quickly and easily by the computer. The computer simply stores a bit pattern corresponding to a desired line color to consecutive storage locations in the memory that map to pixels within the line segment.

The ability to draw horizontal line segments quickly is important in many graphics operations. One common graphics operation that uses horizontal line segment drawing is that of "filling" a closed figure in an image with a solid color. The "fill" is accomplished by drawing a number of short horizontal line segments extending between the left to right edges of the closed figure. A number of such lines, one drawn below another from top to bottom of the figure, fill the figure with a single solid color.

The ability of computers to quickly draw solid color, horizontal line segments, however, can be affected by the number of data bits controlling the color of pixels in the image. This is because computer systems are generally structured to most efficiently transfer, or store, only certain numbers of data bits at a time. For example, a computer with a 32-bit central processing unit (processor) reads and writes data with its processor to memory most efficiently in groups of 32-bits (double words). Further, some 32-bit processors store double words most efficiently to memory locations aligned with every fourth byte of memory (double word boundaries). Such 32-bit processors are therefore best suited to repeatedly store a 32-bit long pattern to consecutive locations aligned with double word boundaries in a memory. The 32-bit processor simply loads the 32-bit pattern from memory into an internal register, then repeatedly stores the pattern in consecutive 32-bit double words to the memory in double word boundary alignment.

This straightforward procedure can be used effectively for drawing line segments when pixels map to groups of 32-bits and even to groups of 16 or 8-bits. (When 16 and 8-bit groups map to a pixel, the line can be drawn 2 and 4 pixels at a time respectively by consecutively storing a 32-bit pattern to the memory.) Exemplary assembly language code listings for an Intel 80386 or 80486 microprocessor implementing this procedure for 8, 16, and 32-bit per pixel (bpp) images are illustrated in the following tables 1–3.

TABLE 1

Code for drawing 1000 pixel, 32-bpp line.
mov eax,<32-bit color>
mov ecx, 1000
rep stosd

TABLE 2

Code for drawing 2000 pixel, 16-bpp line.
mov eax, <16-bit color, 16-bit color>
mov ecx, 1000
rep stosd

TABLE 3

Code for drawing 4000 pixel, 8-bpp line.
mov eax, <8-bit color repeated 4x>
mov ecx, 1000
rep stosd However, the procedure is not effective for bit-mapped images that use 24-bits per pixel. With 24-bit per pixel images, the required pattern does not repeat once every 32-bits. Instead, the pattern repeats 1⅓ times every 32-bits and therefore cannot be created by consecutively storing a single 32-bit pattern.

A technique for effectively storing a sequence containing a repeated 24-bit pattern to memory in consecutive 32-bit double word increments is therefore needed.

SUMMARY OF THE INVENTION

The invention provides an efficient method and apparatus for storing in a memory a repeated pattern of data whose length is not optimal for transfer to the memory. According to the invention, a register is loaded with the data pattern repeated sufficiently to complete a data sequence whose length is optimal for memory transfer. The data pattern is then repeatedly transferred, or stored, to memory by storing a data sequence and shifting of the data pattern to produce a following data sequence that, when stored to memory, continues the data pattern already stored in memory.

In particular, the present invention provides a method and an apparatus for efficiently storing a sequence containing a repeated 24-bit pattern to memory in consecutive double word increments. The invention is also applicable to storing sequences with repeated patterns having various other bit lengths in increments that are four-thirds the bit length of the repeated pattern. According to the present invention, a 32-bit processor loads an internal register with the initial 32-bits of a sequence containing a repeated 24-bit pattern. The processor then repeatedly and alternately stores the 32-bits of the sequence contained in the register consecutively in memory and generates in the register the next 32-bits of the sequence from the current 32-bits. The processor generates the next 32-bits of the sequence by shifting the bits currently in a second through fourth byte locations of the register to a first through third byte locations, and also shifting the bits currently in the second byte location to the fourth byte location.

In one embodiment of the invention, the processor shifts the bits in the register to generate the next 32-bits of the sequence by first, moving the bits in the second byte location to the first byte location, and second, rotating the bits then in the second through fourth byte locations to the first through third byte locations and the bits in the first byte location to the fourth byte location.

In another embodiment of the invention, the processor shifts the bits in the register to generate the next 32-bits of the sequence by first, moving the bits in the second byte location to a byte location of a second register, and second, shifting the bits in the second through fourth byte locations to the first through third byte locations and the bits in the second register byte location to the fourth byte location.

In accordance with a further aspect of the invention, the processor aligns the consecutively stored double words with double word boundaries in memory. When the sequence being stored to memory is to start one byte location before a double word boundary in memory, the processor stores the first byte of the sequence to the byte location and then shifts the bits currently in the second through fourth byte locations of the register to the first through third byte locations and also shifts the bits currently in the second byte location to the fourth byte location. The processor can then proceed to store the sequence to memory in double word increments aligned with double word boundaries in memory.

When, however, the sequence being stored to memory is to start two byte locations before a double word boundary in memory, the processor stores the first two bytes of the sequence from the register to memory and then shifts the bits in the third and fourth byte locations of the register to the first and second byte locations and the bits in the second and third byte locations to the third and fourth byte locations. Thereafter, double words that are consecutively stored by the processor are aligned with double word boundaries of memory.

When the sequence being stored to memory is to start three byte locations before a double word boundary in memory, the processor stores the first three bytes of the sequence from the register to memory and, thereafter, stores the sequence to memory in double word increments aligned with double word boundaries in memory.

Additional features and advantages of the invention will be made apparent from the following detailed description of a preferred embodiment which proceeds with reference to the accompanying drawings.

DETAILED DESCRIPTION OF THE PREFERRED EMBODIMENT

A preferred embodiment of the invention is implemented in machine code executable on a personal computer with an Intel 80386 or 80486 microprocessor. As will be apparent to one skilled in the art, the invention can be otherwise embodied to execute on other computer systems having a 32-bit or other type microprocessor.

Figure 1:
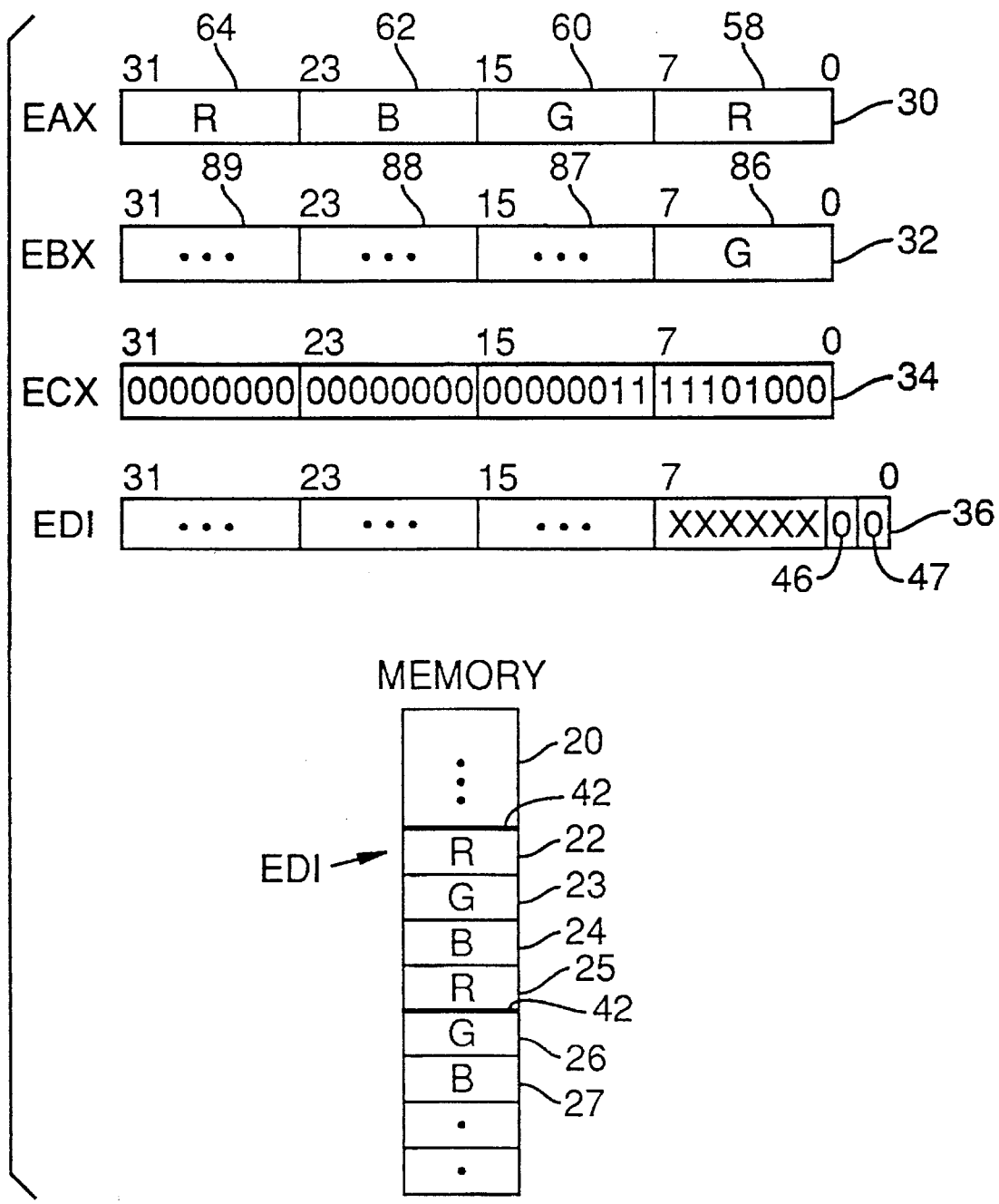
FIG. 1 is a block diagram of selected registers in a microprocessor and of a memory addressable by the processor, all used according to the method of FIG. 2.

Referring to FIG. 1, the preferred embodiment of the invention stores a sequence containing a repeating 3-byte pattern in a memory 20. The memory 20 comprises a plurality of individually addressable memory locations 22–27 arranged in a sequential order, and capable of storing one byte of data each. The memory 20 may also be referred to as video memory or a frame buffer in certain applications of the invention.

In the preferred embodiment, the memory 20 stores a 24-bit per pixel, color bit-mapped graphic image. The colors of the pixels in the image are controlled by groups of three bytes for each pixel in the memory. The color of a pixel in the image is changed by storing a 3-byte color value in the respective three bytes of memory that map to the pixel. Each 3-byte color value is a code according to the red-green-blue (RGB) color model for representing colors. The three bytes of the color value represent the red, green, and blue components, respectively, of the coded color. The three bytes of data in locations 22–24, for example, determine the color of one pixel of the image. Storing a 3-byte color value (with bytes labelled R, G, and B) in the locations 22–24 change the pixel to a color corresponding to the 3-byte color value. Storing the data sequence of a repeated 3-byte data pattern in the memory 20 therefore draws a solid color, horizontal line segment in the bit-mapped image.

The Intel 80386 and 80486 microprocessors comprise a plurality of 32-bit general registers including the EAX 30, EBX 32, ECX 34, and EDI 36 registers. In the preferred embodiment, the EAX register 30 is used to store the next double word of the sequence to be transferred, or stored, to memory. The EBX register 32 is used as a temporary storage for bit manipulation operations. The ECX register 34 is used as a loop counter. The EDI register 36 is used as an address pointer to a location in memory where the next double word of the sequence is to be stored. The present invention, however, can be implemented using a different set of registers within the Intel microprocessors or using registers in a different processor altogether.

The Intel 80386 and 80486 microprocessors store data to the memory 20 most effectively in double words aligned with double word boundaries 42 in the memory 20. Thus, the 3-byte data pattern length is not optimal for transfer of the pattern to the memory. A double word boundary occurs every fourth byte of memory at addresses of 0, 4, 8, 12, etc. ... (i.e. at addresses whose two least significant bits 46, 47 are zeroes). In the preferred embodiment of the invention, therefore, the data sequence is stored in the memory 20 in double word increments aligned with double word boundaries 42. The data sequence length of four bytes is optimal for transferring data from the EAX register 30 to the memory.

Figure 2:
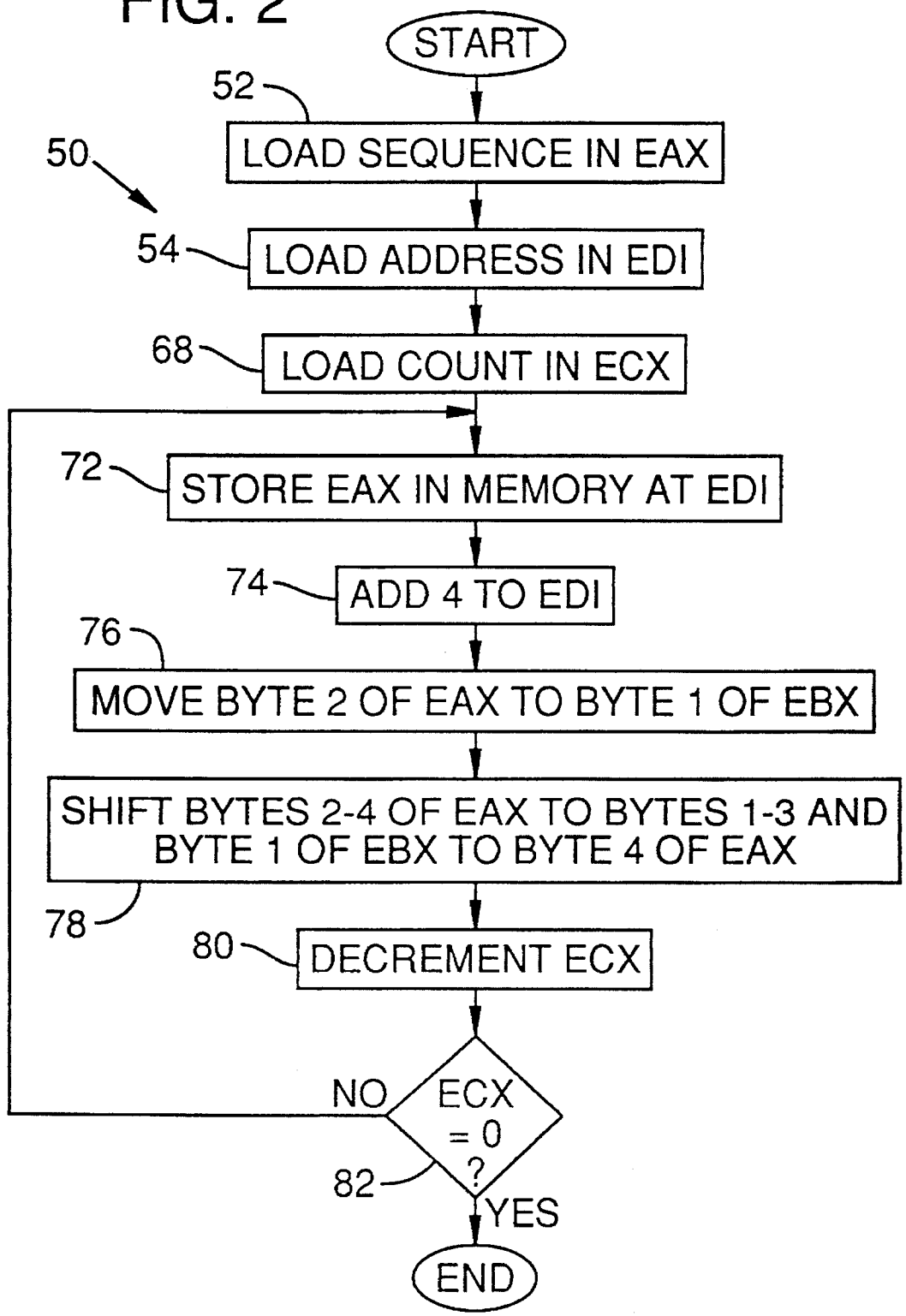
FIG. 2 is a flow chart of a method according to one embodiment of the invention for storing a sequence containing a repeated 3-byte pattern in consecutive double word increments to the memory shown in FIG. 1.

In one embodiment of the invention, the processor registers 30–36 are used according to the method 50 illustrated in FIG. 2 to store a sequence with a 3-byte repeated pattern in the memory 20. The corresponding assembly language code for the method is shown in the following table 4:

TABLE 4

| | Code for storing repeated 3-byte pattern. | |
|---|---|---|
| 1 | mov | eax, <rgbr> |
| 2 | mov | ecx, 1000 |
| 3 | loop | |
| 4 | stosd | |
| 5 | mov | bl, ah |
| 6 | shcd | eax, ebx, 8 |
| 7 | dec | ecx |
| 8 | jnz | loop |

In the preferred embodiment of the invention, machine code corresponding to the assembly language procedure in Table 4 forms a portion of a program loaded into the computer's memory.

With reference to FIG. 2, the method 50 begins by loading (line 1, Table 4) the first four bytes of a sequence into the EAX register 30 (step 52). In the illustrated embodiment, the sequence contains a repeated 3-byte color value, the individual bytes of which are labelled herein as "R," "G," and "B," respectively. Therefore, the first four bytes of the sequence are "RGBR." The Intel 80386 and 80486 microprocessors load data into the EAX register with a right-most byte location 58 first, followed by second through fourth byte locations 60–64, respectively. The EAX register 30 is shown loaded according to step 52 in FIG. 1.

The next step 54 of the method 50 is to load the EDI register 36 with the initial address where the sequence is to be stored in memory. In the preferred embodiment, the initial address points to the location in memory that maps to a left-most pixel of a line segment that will be formed in the image stored in the memory 20 by performing the method 50. The code in table 4 assumes the initial address is already loaded into the EDI register 36. To store the sequence most effectively, the initial address should be aligned with a double word boundary 42 of the memory 20, i.e. the two least significant bits 46, 47 of the EDI register 36 should be zeroes as shown in FIG. 2. A method according to the invention for aligning with double word boundaries when the initial address is not aligned with a double word boundary 42, is described below in connection with FIGS. 4–6.

In the next step 68 (line 2, Table 4), a count value is loaded into the ECX register 34. In the embodiment illustrated by FIGS. 1, 2, and Table 4, the ECX register is loaded with a count of 1000. The count corresponds to the number of double word increments of the sequence that will be transferred to memory by the method 50.

Steps 72–82 of the method 50 form a loop which is repeated a number of times equal to the count value in the ECX register 34. The ECX register is decremented at step 80 (line 7, Table 4) and the decremented count value compared to zero at step 82 (line 8, Table 4). If the decremented count value is not equal to zero, the loop is repeated by jumping back to step 72 (line 3, Table 4).

At step 72 within the loop 72–82, the processor stores the contents of the EAX register 30 to the memory locations 22–25 at the address in the EDI register 36 (line 4, Table 4). Next, at step 74, the address in the EDI register 36 is incremented by four. (The address in the EDI register 36 is automatically incremented by four by the "stosd" instruction at line 4, Table 4.) Therefore, in each iteration of the loop, steps 72–74 place the next double word of the sequence into the next consecutive location of memory.

Steps 76–78 update the contents of the EAX register 30 to the next double word of the sequence. At step 76, the processor moves the byte in the second byte location 60 to a byte location 86 in the EBX register 32 (line 5, Table 4). (A "move" instruction in assembly language in effect "copies" the byte to the destination location since the source location remains unchanged.) At step 78, the processor shifts the bytes in the second through fourth byte locations 60–64 of the EAX register 30 to the first through third byte locations 58–62 and also shifts the byte in the byte location 86 of the EBX register 32 to the fourth byte location 64 of the EAX register (line 6, Table 4). The effect of steps 76, 78 is to shift the bytes in the second through fourth byte locations 60–64 of the EAX register 30 to the first through third byte locations 58–62 and the byte in the second byte location 60 to the fourth byte location 64. In the first iteration of the loop 72–82, steps 76–78 change the double word in the EAX register 30 from "RGBR" to "GBRG." The second iterations changes the double word to "BRGB." The third iteration changes the double word back to the original "RGBR."

When the method 50 is finished, the processor has stored a sequence, "RGBR GBRG BRGB RGBR ...," to memory in double word increments starting at the initial address. The sequence contains a repeated 3-byte pattern "RGB." In the preferred embodiment, storing the sequence results in drawing a solid horizontal line segment in the image stored in the memory.

Figure 3:
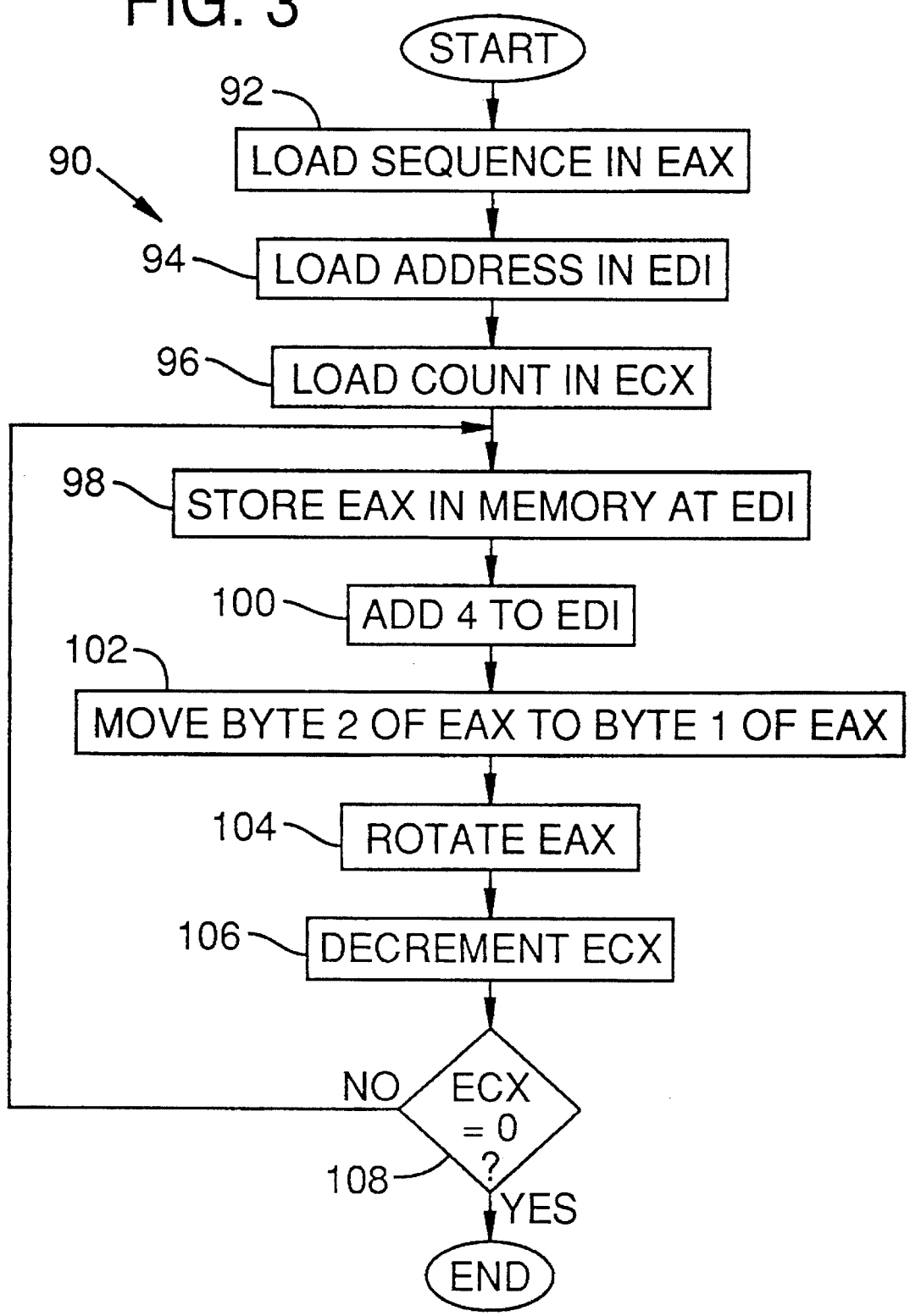
FIG. 3 is a flow chart of a method according to another embodiment of the invention for storing a sequence containing a repeated 3-byte pattern in consecutive double word increments to the memory shown in FIG. 1.

Referring to FIG. 3, in a method 90 according to another embodiment of the invention, a next double word of the sequence is generated from a current double word in the EAX register 30 without using the EBX register 32. With the Intel 80386 and 80486 processors, this method also has the advantage of requiring fewer instruction bytes. In some processors, this method may also execute in fewer clock cycles. An assembly language code listing implementing the method 90 is shown in the following Table 5:

TABLE 5

| | Code for storing repeated 3-byte pattern. | |
|---|---|---|
| 1 | mov | eax, <rgbr> |
| 2 | mov | ecx, 1000 |
| 3 | loop: | |
| 4 | stosd | |
| 5 | mov | al, ah |
| 6 | ror | eax, 8 |
| 7 | dec | ecx |
| 8 | jnz | loop |

The method 90 (FIG. 3) has steps 92–100 and 106–108 that are identical to steps 52–74 and 80–82 of the method 50 (FIG. 2). The method differs only in the steps 102–104 (lines 5–6, Table 5) for generating the next double word of the sequence. In step 102, the byte in the second byte location 60 of the EAX register 30 is moved to the first byte location 58 of the EAX register. Then, in step 104, the contents of the EAX register 30 are rotated to the right by one byte. Rotating the EAX register shifts the bytes in the second through fourth byte locations 60–64 to the first through third byte locations 58–62 and shifts the byte in the first byte location 58 to the fourth byte location 64. The result of the steps 102–104 is the same as that of steps 76–78 (FIG. 2) in that the bytes in the second through fourth byte locations 60–64 are shifted to the first through third byte locations 58–62 and the byte in the second byte location 60 is also shifted to the fourth byte location 64. However, in steps 102–104 the EBX register 32 is not required and can therefore be used for other purposes by a program employing the method.

The methods 50, 90 of FIGS. 2, 3 assume that the initial address in the EDI register is aligned with a double word boundary 42 (FIG. 1). However, in most cases, the initial address will not be aligned with a double word boundary. When drawing a horizontal line in a 24-bit per pixel bit-mapped image, for example, the byte locations of memory controlling left-most pixel of the image (which determine the initial address) will only occur on a double word boundary one time in four on the average. In cases where the initial address of the sequence to be stored is not aligned with a double word boundary, it is desirable to store in the memory 20 the initial bytes of the sequence up to the double word boundary before storing the remainder of the sequence in double word increments. The double word increments are thereby stored in double word boundary alignment.

Figure 4:
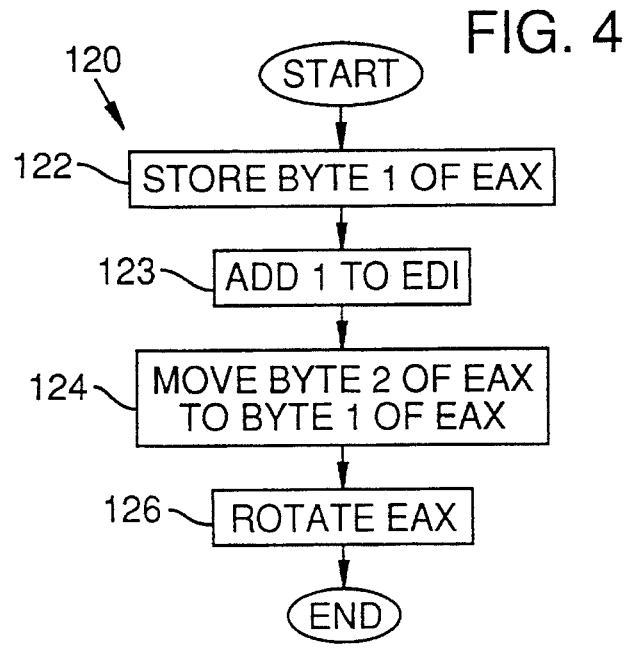
FIG. 4 is a flow chart of a method according to the invention for aligning the consecutively stored double words with double word boundaries of the memory shown in FIG. 1 when the sequence begins one byte from a double word boundary.

Referring now to FIG. 4, a method 120 can be executed after step 68 (FIG. 2) or step 96 (FIG. 3) to align the double word stored at steps 72, 98, respectively, with double word boundaries 42 when the initial address is one byte from a next double word boundary. For example, the method 120 is executed when the initial address points to memory location 25 in memory 20, which is one byte from the next memory location 26 aligned with a double word boundary 42. The two least significant bits 46, 47 of the EDI register will be ones in such a circumstance. The following Table 6 illustrates an exemplary assembly language code listing implementing the method 120:

TABLE 6

| Code for double word boundary alignment. | | |
| --- | --- | --- |
| 1 | stosb | |
| 2 | mov | al, ah |
| 3 | ror | eax, 8 |

At a first step 122 of the method 120, the processor transfers a copy of the byte in the first byte location 58 of the EAX register 30 to the memory location addressed by the EDI register 36. At step 123, the processor increments the address in the EDI register 36. (The single instruction "stosb" at line 1, Table 6 implements both steps 122, 123.) The address in the EDI register now points to a memory location aligned with a double word boundary 42.

In steps 124, 126, the double word in the EAX register is updated to the next double word in the sequence. First, in step 124, the byte in the second byte location 60 of the EAX register 30 is moved to the first byte location 58. In step 126, the EAX register is rotated one byte to the right. The EAX register 30 will then contain the next double word of the sequence to be stored in the memory. Steps 124, 126 are identical to steps 102–104 (FIG. 3). The processor is now ready to proceed with storing double word increments of the sequence to memory as in the loop portions 72–82 and 98–108 of the methods 50 and 90, respectively.

Figure 5:
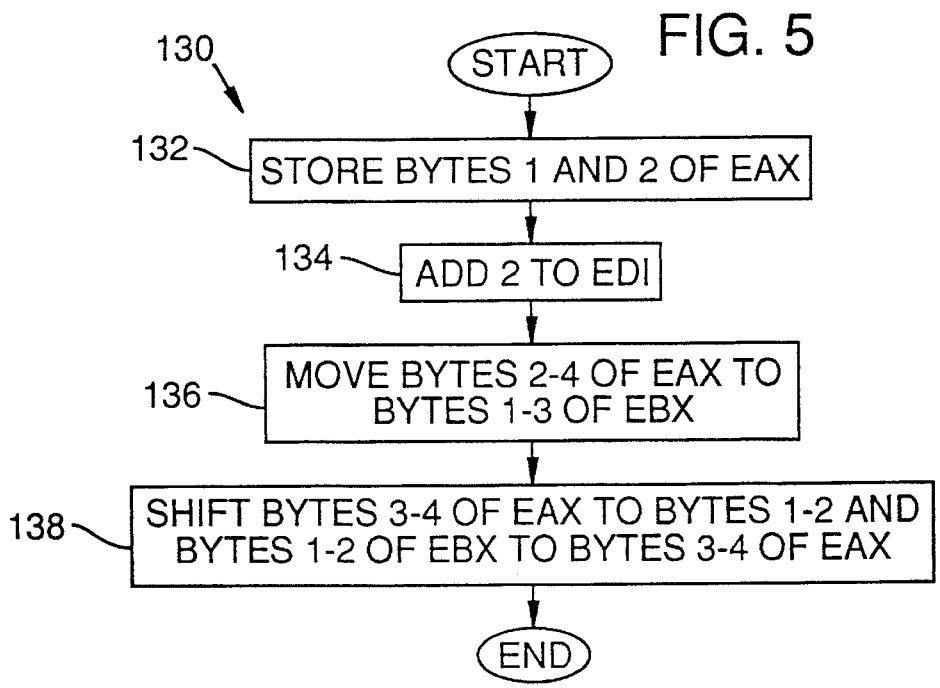
FIG. 5 is a flow chart of a method according to the invention for aligning the consecutively stored double words with double word boundaries of the memory shown in FIG. 1 when the sequence begins two bytes from a double word boundary.

With reference to FIG. 5, a further method 130 operates to align the double words stored according to methods 50 and 90 with double word boundaries 42 when the initial address in the EDI register 36 is two bytes from the next double word boundary. The initial address will have a "10" in its two least significant bits 46, 47 in this circumstance. The following Table 7 illustrates an exemplary assembly language code listing implementing the method 130:

TABLE 7

| Code for double word boundary alignment. | | |
| --- | --- | --- |
| 1 | stosw | |
| 2 | shld | ebx, eax, 24 |
| 3 | shed | eax, ebx, 16 |

Steps 132, 134 include storing the bytes in the first and second byte locations 58, 60 of the EAX register 30 to memory and incrementing the address in the EDI register 36 by two (line 1, Table 7). The address in the EDI register then points to a memory location aligned with a double word boundary.

Steps 136, 138 generate the next double word of the sequence. In step 136, the bytes in the second through fourth byte locations 60–64 of the EAX register 30 are moved to the first through third byte locations 86–88 of the EBX register 32 (line 2, Table 7). In step 138, the bytes in the third and fourth byte locations 62–64 of the EAX register 30 are shifted to the first and second byte locations 58–60 and the bytes in the first and second byte locations 86–87 of the EBX register are shifted to the third and fourth byte locations 62–64 of the EAX register. The result of the steps 136, 138 is to shift the bytes in the second and third byte locations 60–62 of the EAX register to the third and fourth byte locations 62–64 and the bytes in the third and fourth byte locations to the first and second byte locations 58–60. For example, with an initial double word of "RGBR," the steps 136, 138 produce the double word "BRGB" which is the next double word of the sequence following the first two bytes "RG." After the method 130 is performed, the loop portions 72–82 and 98–108 of the methods 50 and 90, respectively, can be performed to store the sequence in double word increments aligned with double word boundaries 42 of the memory 20.

Figure 6:
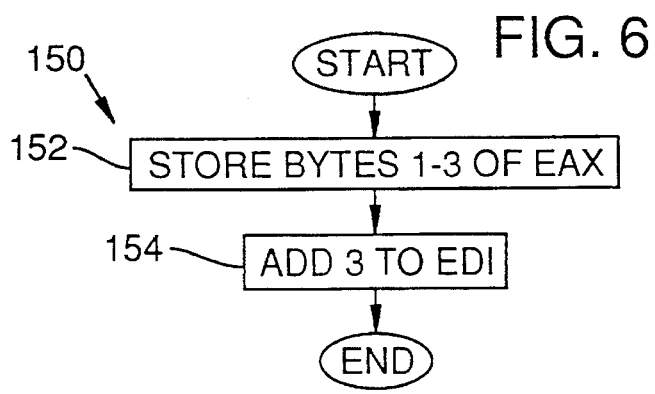
FIG. 6 is a flow chart of a method according to the invention for aligning the consecutively stored double words with double word boundaries of the memory shown in FIG. 1 when the sequence begins three bytes from a double word boundary.

Referring to FIG. 6, in the case where the initial address is three bytes from the next double word boundary, a method 150 for aligning stored double words with double word boundaries need only store the first three bytes of the sequence in memory and increment the address by three (steps 152, 154). The next double word to be stored need not be altered because the sequence repeats the 3-byte pattern again after the initial three bytes. For example, after storing the first three bytes of the sequence "RBGR . . . ," the next double word of the sequence is still "RBGR." The following Table 8 is an assembly language code listing for implementing the method 150:

TABLE 8

| Code for double word boundary alignment. | | |
| --- | --- | --- |
| 1 | stosb | |
| 2 | shld | ebx, eax, 24 |
| 3 | mov | es:[edi], bx |
| 4 | add | edi, 2 |

Having described and illustrated the principles of our invention with reference to a preferred embodiment, it will be recognized that the invention can be modified in arrangement and detail without departing from such principles. For example, although illustrated with reference to a preferred embodiment in which a repeating 24-bit pattern is stored in 32-bit increments, it will be recognized that the invention can be otherwise embodied to store a repeated pattern of any number of bits in increments of four-thirds the number of bits in the pattern. In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of storing in a memory a repeated multiple-bit data pattern whose length is smaller than an optimal length for efficient data transfer to the memory, the optimal length being other than an integer multiple of the data pattern's length, the method comprising:

loading a first register with the data pattern repeated sufficiently to complete a data sequence of the optimal length for efficient data transfer to the memory; and repeating for a finite number of times the following steps:

storing the data sequence in locations in the memory beginning at a given address;

incrementing the address for storing a following data sequence; and rearranging the data sequence within the first register to produce the following data sequence that, when stored to the memory, continues the data pattern already stored in the memory.

2. The method of claim 1 wherein the optimal length of data transfer to the memory is four thirds times the length of the data pattern.

3. The method of claim 2 wherein the first through third bytes of the data pattern correspond to red, green and blue components of a 24-bit color value, respectively, and wherein the repeated pattern of data represents a solid segment in a bit-mapped image stored in the memory.

4. The method of claim 1 wherein the first register has four locations, the data pattern has first through third bytes, and loading the first register to complete a data sequence comprises:

loading the first through third bytes of the data pattern in the first three locations of the register, respectively; and loading the first byte into the fourth location.

5. The method of claim 4 wherein the rearranging step comprises:

shifting the data sequence one byte toward the first location of the first register; and moving the byte which was previously in the second location of the first register prior to the rearranging step to be in the fourth location of the first register after the rearranging step.

6. The method of claim 5 wherein the step of moving the byte in the second location of the first register into the fourth location of the first register comprises:

moving the byte in the second location of the first register into a second register before shifting the data pattern one byte toward the first location of the first register; and moving the byte from the second register into the fourth location of the first register after the shifting step, thereby placing the byte in the second location of the first register into the first and fourth locations of the first register.

7. The method of claim 4 wherein the rearranging step comprises:

moving the byte in the second location of the first register into the first location of the first register; and rotating the bytes in the first register one byte toward the first location of the first register, thereby placing the second byte into the first and fourth locations.

8. The method of claim 1 wherein the memory has double word boundaries and the data sequences comprise four bytes stored in double word increments to locations in memory in alignment with double word boundaries.

9. The method of claim 1 wherein the memory has double word boundaries, the method further comprising the step of aligning the data sequence in the first register with a double word boundary if the beginning address of the memory locations does not coincide with such a boundary.

10. The method of claim 9 wherein the data sequences each comprise four bytes in the first register and the aligning step comprises:

storing a number of bytes from the first register to the locations in memory equal to the number of bytes from the beginning address to the next double word boundary;

if the beginning address is one memory location from the next double word boundary, shifting the bytes in the first register by one byte toward the first byte location, including moving the byte in the second location into the fourth byte location of the first register; and if the beginning address is two memory locations from the next double word boundary, shifting the bytes in the first register by two bytes toward the first byte location, including moving the bytes in the second and third locations of the first register into the third and fourth locations, respectively.

11. A method of filling consecutive pixels of an image with a three byte color value, comprising:

loading a first register with a four byte sequence, the four byte sequence including the three byte color value;

repeatedly storing for a finite number of times the sequence from the first register to a string of locations in a memory where the consecutive pixels of the image are stored; and updating the sequence in the first register between repetitions of the step of storing;

the step of updating comprising:

shifting the bytes of the sequence in the first register whereby the bytes currently in a second through fourth byte locations of the first register are shifted to a first through third byte locations, respectively, and the byte currently in the second byte location is also moved into the fourth byte location.

12. The method of claim 11 wherein the three byte color value comprises a one byte red component, a one byte green component, and a one byte blue component.

13. The method of claim 11 wherein the step of loading comprises:

loading the three byte color value into the first through third byte locations of the first register and loading a first byte of the three byte color value into the fourth byte location.

14. The method of claim 11 wherein the step of updating comprises:

moving the byte in the second byte location of the first register to the first byte location of the first register; and rotating the sequence in the first register to shift the bytes in the second through fourth byte locations to the first through third byte locations, respectively, and the byte in the first byte location to the fourth byte location.

15. The method of claim 11 wherein the step of updating comprises:

moving the byte in the second byte location of the first register to a first byte location of a second register; and shifting the bytes in the first and second registers whereby the bytes in the second through fourth byte locations of the first register are shifted to the first through third byte locations of the first register, respectively, and the byte in the first byte location of the second register is shifted to the fourth byte location of the first register.

16. The method of claim 11 further comprising, when a first of the string of locations in memory is one location away from a double word boundary:

storing the byte in the first byte location of the first register to the first of the string of memory locations; and shifting the bytes of the sequence in the first register whereby the bytes previously in the second through fourth byte locations of the first register are shifted to the first through third byte locations, respectively, and the byte previously in the second byte location is also shifted into the fourth byte location, whereby the sequence in the first register is repeatedly stored at double word boundaries of the memory.

17. The method of claim 11 further comprising, when a first of the string of locations in memory is two locations away from a double word boundary:

storing the bytes in the first and second byte locations of the first register to the string of memory locations; and shifting the bytes of the sequence in the first register whereby the bytes previously in the third and fourth byte locations are moved to the first and second byte locations, the byte previously in the second byte location is moved to the third byte location, and the byte previously in the third byte location is also moved to the fourth byte location, whereby the sequence in the first register is repeatedly stored at double word boundaries of the memory.

18. The method of claim 11 further comprising, when a first of the string of locations in memory is three locations away from a double word boundary:

storing the bytes in the first through third byte locations of the first register to the string of memory locations, whereby the sequence in the first register is repeatedly stored at double word boundaries of the memory.

19. An apparatus for storing a repeating 3-byte pattern to a memory in double word increments, comprising:

a memory which is writable in double word increments;

a register having a first through fourth byte locations for storing a four byte sequence, the sequence including the 3-byte pattern; and means for repeatedly writing for a finite number of times the sequence in the register to the memory and updating the sequence between writes to the memory, the means updating the sequence by shifting the bytes previously in the second through fourth byte locations to the first through third byte locations, respectively, and moving the byte previously in the second byte location to the fourth byte location.

20. The apparatus of claim 19 wherein the means for repeatedly writing and updating comprises:

means for moving the byte in the second byte location to the first byte location; and means for rotating the bytes in the register so that the bytes in the second through fourth byte locations are shifted to the first through third byte locations and the byte in the first byte location is shifted to the fourth byte location.

21. The apparatus of claim 19 further comprising:

a second register having a first byte location;

the means for repeatedly writing and updating comprising:

means for moving the byte in the second byte location of the first register to the first byte location of the second register; and means for shifting the bytes in the second through fourth byte locations of the first register to the first through third byte locations, and the byte in the first byte location of the second register to the fourth byte location of the first register.

22. The apparatus of claim 19 further comprising:

means for aligning the sequence such that the sequence is written to memory in alignment with double word boundaries, the means for aligning comprising:

means for writing the byte sequence in the register to the memory from an initial memory location to the next adjacent double word boundary; and means for shifting the sequence in the register, the means for shifting comprising:

means for shifting the bytes currently in the second through fourth register byte locations to the first through third register byte locations, respectively, and shifting the byte currently in the second register byte location to the fourth register byte location, if the initial memory location is one byte from the next adjacent double word boundary; and means for shifting the bytes currently in the third and fourth register byte locations to the first and second register byte locations, respectively, and the bytes currently in the second and third register byte locations to the third and fourth register byte locations, respectively, if the initial memory location is two bytes from the next adjacent double word boundary.

23. A method of incrementally storing a repeating multiple-bit data pattern in a memory, the method comprising:

loading a register with the data pattern repeated sufficiently to complete a multiple bit data sequence having a length in bits other than an integer multiple of the data pattern's length in bits;

storing the data sequence to the memory consecutively beginning at a given address;

updating the data sequence after each time the data sequence is stored in the memory with the following steps:

shifting the data sequence towards a first bit of the data sequence by a number of bits equal to the difference in length of the data pattern from the data sequence; and copying a beginning portion of the data sequence to an end portion of the data sequence, the beginning and end portions each having a length equal to the difference in length of the data pattern from the data sequence.

* * * * *